(12) United States Patent
Kinoshita et al.

(10) Patent No.: US 8,707,661 B2
(45) Date of Patent: Apr. 29, 2014

(54) PACKAGING AND FILLING MACHINE

(75) Inventors: Shigeharu Kinoshita, Tokyo (JP);
Dennis Lundmark, Tokyo (JP); Naoya Isshiki, Tokyo (JP); Katsunori Nakanishi, Tokyo (JP); Keiji Yano, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 596 days.

(21) Appl. No.: 13/060,016

(22) PCT Filed: Aug. 22, 2009

(86) PCT No.: PCT/JP2009/004046
§ 371 (c)(1),
(2), (4) Date: Apr. 27, 2011

(87) PCT Pub. No.: WO2010/023859
PCT Pub. Date: Mar. 4, 2010

(65) Prior Publication Data
US 2011/0192113 A1 Aug. 11, 2011

(30) Foreign Application Priority Data
Aug. 24, 2008 (JP) ................................ 2008-214747
Sep. 16, 2008 (JP) ................................ 2008-236015

(51) Int. Cl.
*B65B 1/36* (2006.01)
*B65B 9/08* (2012.01)

(52) U.S. Cl.
USPC ........... 53/503; 53/52; 53/55; 53/451; 53/551

(58) Field of Classification Search
USPC ............. 53/451, 450, 550, 551, 545, 52, 503, 53/55; 222/71
See application file for complete search history.

(56) References Cited

U.S. PATENT DOCUMENTS 4,617,779 A * 10/1986 Nygren et al. .................. 53/433
4,780,830 A * 10/1988 Omi et al. ..................... 700/219
(Continued)

FOREIGN PATENT DOCUMENTS

| JP | 55-108096 U | 7/1980 |
| JP | 63-232104 A | 9/1988 |

(Continued)

OTHER PUBLICATIONS

International Search Report (PCT/ISA/210) issued on Nov. 10, 2009, by Japanese Patent Office as the International Searching Authority for International Application No. PCT/JP2009/004046.

*Primary Examiner* — Christopher Harmon
(74) *Attorney, Agent, or Firm* — Buchanan Ingersoll & Rooney PC

(57) ABSTRACT

A packing and filling machine produces a container by forming web-shaped packing material into a tube, filling the tube with liquid food up to a liquid level, and laterally sealing the tube with a seal jaw and a counter jaw under the liquid level. The machine includes a diagnostic device having a pressure flange above the position of the lateral sealing under the liquid level and including sterilized gas to detect a vibration propagated when the packing material is clamped by the seal jaw and counter jaw and to diagnose the residual quantity of sterilized gas from the vibration thus detected. The packing and filling machine operating at high speed does not damage the external surface or the longitudinal sealing portion of a packing container, and even the forming/lateral sealing pressing from the opposite sides at high speed does not have a tendency to vary or oscillate the liquid level.

8 Claims, 11 Drawing Sheets

(56) References Cited

U.S. PATENT DOCUMENTS

| | | | |
|---|---|---|---|
| 4,809,485 A * | 3/1989 | Nielsen | 53/503 |
| 4,825,623 A * | 5/1989 | Ross | 53/437 |
| 4,827,697 A * | 5/1989 | Ross | 53/437 |
| 4,838,325 A | 6/1989 | Bordini | |
| 4,984,601 A * | 1/1991 | Andersson et al. | 137/486 |
| 5,546,733 A * | 8/1996 | Paltrinieri | 53/503 |
| 6,035,614 A | 3/2000 | Gustafsson et al. | |
| 7,946,101 B1 * | 5/2011 | McGonagle et al. | 53/474 |
| 8,291,591 B2 * | 10/2012 | Miyajima et al. | 29/890.1 |
| 2006/0105124 A1 | 5/2006 | Kikuchi | |
| 2012/0023871 A1 * | 2/2012 | Wanibe | 53/456 |

FOREIGN PATENT DOCUMENTS

| | | |
|---|---|---|
| JP | 1-82102 U | 6/1989 |
| JP | 10-167207 A | 6/1998 |
| JP | 11-49105 A | 2/1999 |
| JP | 2004-98648 A | 4/2004 |

* cited by examiner

PACKAGING AND FILLING MACHINE

FIELD OF THE INVENTION

The present invention relates to a packaging and filling machine transversal-sealing and cutting a tube packaging material filled with liquid food every container, and manufacturing containers.

BACKGROUND ART

When a package container having liquid food such as milk, mineral water, tea, juice, soup, alcohols, or the like is produced, a web-shaped laminated packaging material is used, the packaging container is formed by sealing of a laminated packaging material with heat sealing, ultrasonic sealing and the like. For example, in a packaging and filling machine, first of all, strip is applied on an edge of web-shaped laminated packaging material, the laminated packaging material is formed in the shape of tube, both edges of the laminated packaging material and the strip which protects an inside end face of the longitudinal sealing part are pushed from the inside of the tube and are sealed in longitudinal direction (lengthwise) with a longitudinal sealing apparatus, the liquid-food-filled tube-shaped laminated packaging material is seals in transverse direction with a transversal sealing apparatus and is cut, a pillow-shaped preform container is formed, and the preform container is formed into predetermined shape, and a package container is completed.

FIG. 3 is a schematic perspective view showing an example of a packaging and filling machine. A reel of the web-shaped laminated packaging material 1 is in-fed into the packaging and filling machine. The laminated packaging material 1 comprises a flexible laminate of a paper substrate and polyethylene film laminated on both sides of the paper substrate, if necessary, a barrier layer of aluminum foil, gas barrier resin and the like is laminated between the paper substrate and the film, decorations are previously printed on the parts to correspond to the surfaces of packaging container 14.

The unwinded laminated packaging material 1 is continually conveyed with a feeder of the conveying means, and is conveyed through bending rollers and dancer rollers to a strip applicator 3, a strip 2 is attached in line with one edge of the laminated packaging material 1 with the strip applicator.

A pull-tab is attached, if necessary, with a pull-tab applicator on the laminated packaging material 1. The laminated packaging material 1 is conveyed to a sterilization bath 4, and is sterilized by sterilization liquid of hydrogen peroxide and the like in the sterilization bath 4. The laminated packaging material 1 is conveyed to an air knife 5 to be dried by the air knife 5, and is carried to the interior of sterile room 40. The laminated packaging material 1 is gradually transformed with forming rings 6, other forming rings into the tube shape.

The laminated packaging material 1 is preheated by hot air from a preheating means 8 of the longitudinal sealing apparatus to be sealed lengthwise, liquid food is filled from a bottom end of the filling pipe 7 into the tube-shaped laminated packaging material 1.

FIG. 4 shows an example of the modes of filling and controlling the liquid food to the predetermined liquid level from a filling pipe into the tube-shaped packaging material.

The perpendicular part of filling pipe 7 is prolonged underneath.

The upward part is connected to a control valve 32. A cylindrical float tube 34 is arranged circumferentially outside perpendicular part of the filling pipe 7. The float tube 34 floating in the liquid is located between the tube packaging material 1 and the filling pipe 7, and is put on the external surface of the perpendicularly part of the filling pipe 7 on top and bottom direction freely-movably. In float tube 11, an object to be detected 35 (magnet, transmitter or a tag) is installed. A detector 31 is disposed in the outside of the tube 1. The detector 31 converts changes of the strength and weakness of the signs with the object to be detected into currents, and outputs electrical signals.

When the liquid level is equal to the predetermined level or over, a stop signal is output, and an open signal is output to controller 33, when the liquid level is equal to the predetermined level or less. In the horizontal part of the filling pipe 7, electromagnetic flow control valve 32 is arranged, the electromagnetic flow control valve 32 is controlled by controller 33. The liquid level is controlled on the predetermined level.

The tube-shaped laminated packaging material 1 is guided with rollers, is carried in a transversal sealing apparatus 10, and is sandwiched to be sealed in the transverse direction. The transversal-sealed laminated packaging material is cut with a knif and the like, and pillow-shaped preforming containers 13 are formed.

The detailed partial cross section of transversal sealing apparatus 10 is shown in FIG. 5. In this embodiment, while the tube-like packaging material 1 is carried downward for a distance of the length corresponding to only one packaged container, it is held by pairs of forming flaps 41 and 41, and it is formed as an approximate container shape, the tube-like packaging material is held with pairs of seal jaws 10a, 10a and counter jaws 11, 11, two transversal seal zones are formed by the transversal sealing transversally, the middle of the seal zones of the connected pillow-like preforming bodies is cut by the knife 42, and separated pillow-like preformed bodies 13 are formed.

The preliminary container 13 is conveyed and is formed to the final shape by a final forming device 15, and a liquid-food filled packaged container 14 is produced.

In an example of the filling pipe, the filling pipe is fixed, an air pocket (hollow space) surrounding the filling pipe is sealed, while a packaging and filling machine is operating, a buffering member dampening movement of liquid food in the tube of the packaging material is comprised. (reference patent documents 4)

[patent documents 1] Japanese Utility Model Laid-Open No. 1-82102

[patent documents 2] Japanese Patent Laid-Open No. 10-167207

[patent documents 3] Japanese Patent Laid-Open No. 2004-098648

[patent documents 4] Japanese Patent Laid-Open No. 11-49105

DISCLOSURE OF THE INVENTION

Problem to be Solved by the Invention

However, in the transversal sealing apparatus, while the tube-shaped packaging material is carried downward, and it is held by two pairs of the forming flaps to be formed as the approximate container shape, as well as it is held by the seal jaw and the counter jaw to be transversally sealed in the transversal direction, it is necessary to strongly press the packaging material with the forming flaps, the seal jaws and the counter jaws. When the liquid level of the liquid contents is set rather higher than the position of the transversal sealing apparatus, the liquid water pressure (pressure) increases and it become a resistance (reaction) of the forming and the transversal-sealing. There is danger to scratch the surface of the packaging material (an appearance surface of the container product) by hard forming flaps, seal jaws and counter jaws of the high speed operation and strong press.

In addition, there are dangers to generate failures, cracks, breakages and the like in the sealed portions of the formed packaging material by high inside pressure.

Furthermore, because the forming flaps, the seal jaws and the counter jaws press strongly the contents liquid through the packaging material from both sides at high speed, the contents liquid is rapidly pushed above to flow backward, and liquid level changes and vibrates, and then it becomes difficult to control the level.

When a buffering member including an air pocket is arranged to moderate the rapid backward flow of the liquid food in the tube, due to the operation of the packaging and filling machine, the size of the air pocket reduces gradually, and the buffer capacity drops, and therefore it is necessary to hold the buffer capacity.

The object of the present invention is to provide the packaging and filling machine wherein the forming apparatus and the transversal sealing apparatus operating at high speed do not scratch the appearance surfaces of the packaging containers, and the fluctuation and the vibration of the liquid level by means of the forming and the transversal-sealing strongly pressing from both sides at high speed are reduced, therefore, it is easy to control the liquid level.

In addition, the object of the present invention is to provide the packaging and filling machine wherein the forming apparatus and the transversal sealing apparatus operating at high speed operate efficiency, stably and automatically.

Moreover, the object of the present invention is to provide the packaging and filling machine controlling and holding the buffer capacity moderating the rapid backward flow of the liquid food in the tube, as well as being capable of operating efficiency, stably and automatically.

Means to Solve the Problem

In a packaging and filling machine of this invention, a web-like packaging laminated material is formed to a tube shape, the tube-like packaging material is longitudinally sealed along the longitudinal direction, in both ends of the packaging material, liquid food is filled up to a liquid level of a predetermined position into the tube-like packaging material, while the tube-like packaging material is held with seal jaws and counter jaws below the liquid level at high speed, the tube-like packaging material is transversally sealed by heating and pressing with the seal jaws and the counter jaws along transversal direction, the tube-like packaging material is cut in the transversal seal zone, and packaged containers are manufactured, characterized in that the packaging and filling machine has a pressure-buffering pressure flange provided under the liquid level in the tube-like packaging material and above the transversal-sealing position, as well as comprising a sterilized gas space buffering movement of the liquid food, and a diagnostic means detecting vibration generating by clamping with the seal jaws and counter jaws to diagnose the residual volume of the sterilized gas from the detected vibration.

In preferred embodiment of this invention, the vibration is the specific vibration of the liquid level, and the diagnosis means diagnoses a residual volume of the sterilized gas from frequency and amplitude of the vibration.

In preferred embodiment of this invention, pressure flange comprises a pipe-shaped main body and a ceiling at the upper part of the main body, and is arranged in a periphery of the filling pipe, a pressure buffering portion of the sterilized gas space is formed at the upper part.

In preferred embodiment of this invention, the pressure buffering portion comprises an elastic membrane arranged under the ceiling of the main body, and the sterilized gas filled in the space formed between the elastic membrane and the ceiling.

In preferred embodiment of this invention, the pressure buffering portion comprises an elastic bag arranged under the ceiling of the main body, and the sterilized gas filled in the elastic bag.

In preferred embodiment of this invention, the vibration is a specific vibration of the tube.

In preferred embodiment of this invention, pressure flange comprises a pipe-shaped main body and a ceiling at the upper part of the main body, and is arranged in a periphery of the filling pipe, a pressure buffering portion of the sterilized gas space is formed at the upper part.

In preferred embodiment of this invention, a displacement meter detects the vibration.

Effect of the Invention

The packaging and filling machine of this invention forms the web-like packaging laminated material into the tube shape, longitudinally seals the tube-like packaging material along the longitudinal direction in both ends of the packaging material, fills the tube-like packaging material with the liquid food up to the liquid level of the predetermined position, while the tube-like packaging material is held with seal jaws and counter jaws below the liquid level at high speed, transversally seals the tube-like packaging material by heating and pressing with the seal jaws and the counter jaws along transversal direction, cuts the tube-like packaging material in the transversal seal zone, and manufactures the packaged containers. Because of the transversal-sealing under the liquid level of the web-shaped packaging material filled with the liquid food, no useless air in the container contribute the quality preservation, but at the transversal-seals in the transversal direction, when the contents liquid is pressed from both sides at high speed, the contents liquid is pushed from below, and it flows backward.

In this features of invention, the pressure flange is provided under the liquid level in the tube-like packaging material and above the transversal-sealing position. By holding with seal jaws and counter jaws at high speed, the liquid pushed from below and its pressure moves and spreads to the pressure flange, respectively.

Because the pressure flange comprises the sterilized gas space which has the pressure buffering ability, the liquid pushed from below and its pressure is absorbed and buffered with the pressure buffering sterilized gas, respectively.

The liquid pushed from below and its pressure does not reach above the pressure flange, and the liquid level is able easily to be controlled without the fluctuation and the swinging of the liquid level.

In addition, because there is the buffering area near to the transversal-sealing position under the liquid level, the resistance (reaction) against the operation of the forming and the transversal-sealing can be reduced, and even in the high speed operation and strong hits of the forming flaps, the seal jaws and the counter jaws, the surfaces of the packaging material are not damaged.

In addition, there is no danger to generate failures, cracks, breakages and the like in the sealed pardons of the formed packaging material by high inside pressure.

In the features of this invention, the vibration generated by pinching with the counter jaws and the seal jaws and transmitted in the liquid food is detected. The vibration frequency and the vibration amplitude are affected depending on the conditions of the liquid food as a transmission media. In the liquid food as the transmission media, there is the sterilized gas space in the pressure flange, and the vibration frequency and the vibration amplitude are changed depending on the volume of the sterilized gas space. In the features of this invention, the diagnosis means diagnoses the residual volume of the sterilized gas from the vibration.

Because the residual volume of the sterilized gas (the volume) can be estimated by means of diagnosis means, from the results of the diagnosis, the sterilized gas can be supplied after the operation stopping of the packaging and filling machine or the sterilized gas can be supplied during the operation of the packaging and filling machine, and the depression of the buffer capacity can be prevented by the reduction of the sterilized gas volume beforehand.

By means of this invention, the buffer capacity moderating the rapid backward flow of the liquid food in the tube is controlled and is maintained, the packaging and filling machine is operated efficiently and stably with capable automation.

In the feature of the preferred embodiment of this invention, the specific vibration of the liquid level by pinching with the seal jaws and the counter jaws is detected, and the residual volume of the sterilized gas is diagnosed from the frequency and the amplitude of the specific vibration.

By means of the counter jaws and the seal jaws under the liquid level, at high speed pinching/clamping, when, for example, 15000 containers per hour are formed, the tube-shaped packaging material is pinched at the rate of 4.2 containers per second, namely 4.2 times per second. In addition, by 20000 containers per hour, it is pinched at 5.6 times per second. In the example of pinching 4.2 times per second, the vibration of the liquid level by the pinching is estimated to 4.2 Hz of the frequency of the specific vibration. In this invention, the above specific vibration is detected.

About the vibration, it is found. in this invention that the amplitude of the specific vibration having the specific frequency changes depending on deteriorating of the pressure buffering performance of the sterilized gas.

In this invention, the residual volume of the sterilized gas is diagnosed on the basis of the above finding. From possible estimation of the residual volume of the sterilized gas, it is possible to effectively re-fill, supply, and add the sterilized gas by manual operation and by automation based on an alarm, and the forming apparatus and the transversal sealing apparatus working in high speed are able to be operated efficiency and stably with capable automation.

In the preferred embodiment of this invention, the pressure flange comprises a pipe-shaped main body and a ceiling at the upper part of the main body, and is arranged in a periphery of the filling pipe, a pressure buffering portion of the sterilized gas space is formed at the upper part.

The pressure flange does not interfere with arranging of the filling pipe, and the space in the tube-shaped packaging material can be utilized effectively.

In preferred embodiment of this invention, the pressure buffering portion comprises the elastic membrane arranged under the ceiling of the main body, and the sterilized gas filled in the space formed between the elastic membrane and the ceiling. When the buffering member is the sterilized gas, the gas easily compresses/expands to show buffering function. The vibration/floating of the liquid may cause dangers of gas decreasing by loss and flying, and gas adding by trap of air bubble/dissolved gas from the filled liquid, but the sterilized gas volume can be constantly kept by means of the elastic membrane.

In preferred embodiment of this invention, the pressure buffering portion comprises an elastic bag arranged under the ceiling of the main body, and the sterilized gas filled in the elastic bag.

When the buffering member is the sterilized gas, the gas easily compresses/expands to show buffering function. The vibration/floating of the liquid may cause dangers of gas decreasing by loss and flying, and gas adding by trap of air bubble/dissolved gas from the filled liquid, but the sterilized gas volume can be constantly kept by means of the elastic bag.

In the preferred embodiment of this invention, the machine comprises the diagnostic means detecting vibration generating by clamping/pinching with the seal jaws and counter jaws to diagnose the residual volume of the sterilized gas from the detected vibration.

When the volume of the sterilized gas decreases and the pressure buffering ability deteriorates, it is possible to detect the decreased volume, and to re-fill the sterilized gas, and to recover the pressure buffering ability accurately and effectively.

Correlation with the vibration amount of the tube and the residual volume of the sterilized gas is shown in FIG. 8. In chart diagram of FIG. 8, a vertical axis shows the vibration amount of the tube, and a cross axle shows operation hours, and the sterilized gas was re-filled at the time shown in the arrow. With the operating time of the machine, the vibration amounts of the tube increase, and the vibration amount of the tube came back to the minimum by means of re-filling of the sterilized gas at the time shown in arrow. The correlation between the vibration amounts of the tube and the residual volume of the sterilized gas was shown. The situation was understood.

In preferred embodiment of this invention, the pressure flange comprises a pipe-shaped main body and a ceiling at the upper part of the main body, and is arranged in a periphery of the filling pipe, a pressure buffering portion of the sterilized gas space is formed at the upper part.

In the periphery of the filling pipe, an effective arrangement can be taken. It can be possible to make simple configuration with the pipe and the ceiling. Since the pressure buffering portion comprising the sterilized gas is formed in the upper end, it is possible to easily re-fill with the sterilized gas.

In preferred embodiment of this invention, the displacement meter, for example, a laser displacement meter detects the vibration of the tube by pinching with the seal jaws and the counter jaws. In this embodiment, the vibration is detected as the amplitude. The detect is done with the displacement meter.

When an object moves from a position to another position, displacement sensor (or, displacement meter) measures the movement distance. The system measuring the movement distance (displacement volume) includes non-contact types by using a media of magnetic field and light, and sound wave, and a displacement sensor of contact type such as dial gage or differential transformer, that is, a optics type, supersonic wave type, laser (focus type), and the like.

In the more preferred embodiment of this invention, according to a kind of the filled liquid food, a kind of the packaging material and its specifications, it is possible to predetermine the vibration amount of the tube at the timing to be re-filled, and to re-fill with the sterilized gas when the predetermined vibration amount is detected.

FIG. 9 shows the correlation with the vibration amount of the tube at filling of four kinds of different liquid foods and the residual volume of the sterilized gas. In the chart diagram of FIG. 9, a vertical axis shows the vibration amount of the tube, and a cross axle shows operation hours, and the sterilized gas was re-filled at time shown with the arrow. With the operating time of the machine, the vibration amounts of the tube increase, and the vibration amount of the tube returned to the minimum by means of re-filling of the sterilized gas at the time shown in arrow. The correlation between the vibration amounts of the tube and the residual volume of the sterilized gas was shown. This situation was understood, and according the kind of the liquid food, the different vibration amounts of the tube were shown.

DENOTATION OF REFERENCE NUMERALS

Figure 1:
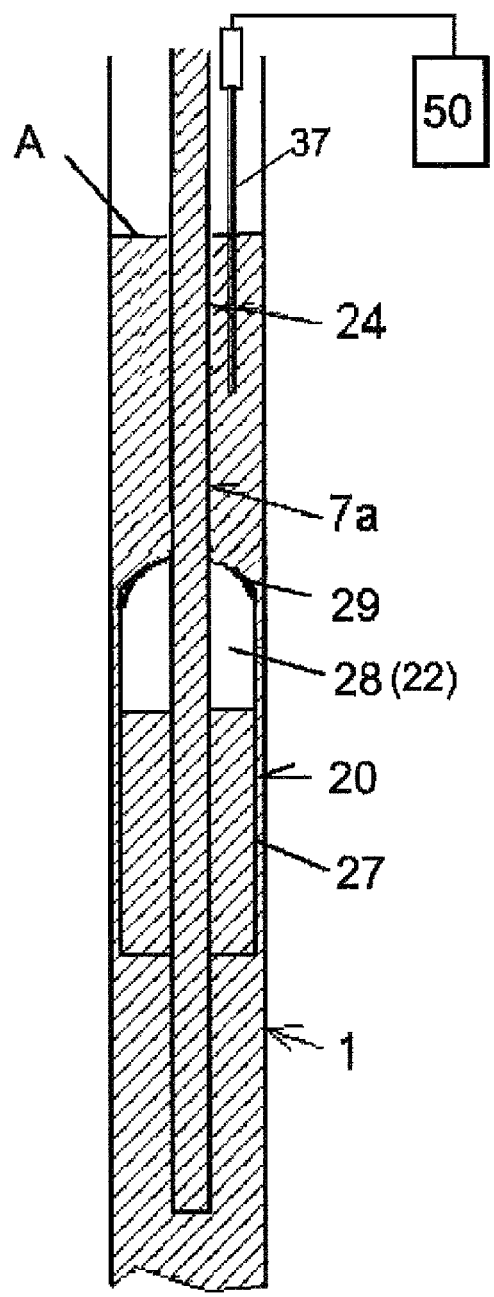
FIG. 1 shows an outline section front view of the pressure flange of the packaging and filling machine of the first example by this invention and diagnosis means.

1 Packaging material
7 Filling pipe
20 Pressure flange
21 Elastic bag
22, 28 Sterilized gas space
26 Elastic membrane
50 Diagnosis means
51 Displacement meter

BEST MODE FOR CARRYING OUT THE INVENTION

The detailed description of the preferred embodiment of the present invention is described below with reference to the related drawings.

Figure 3:
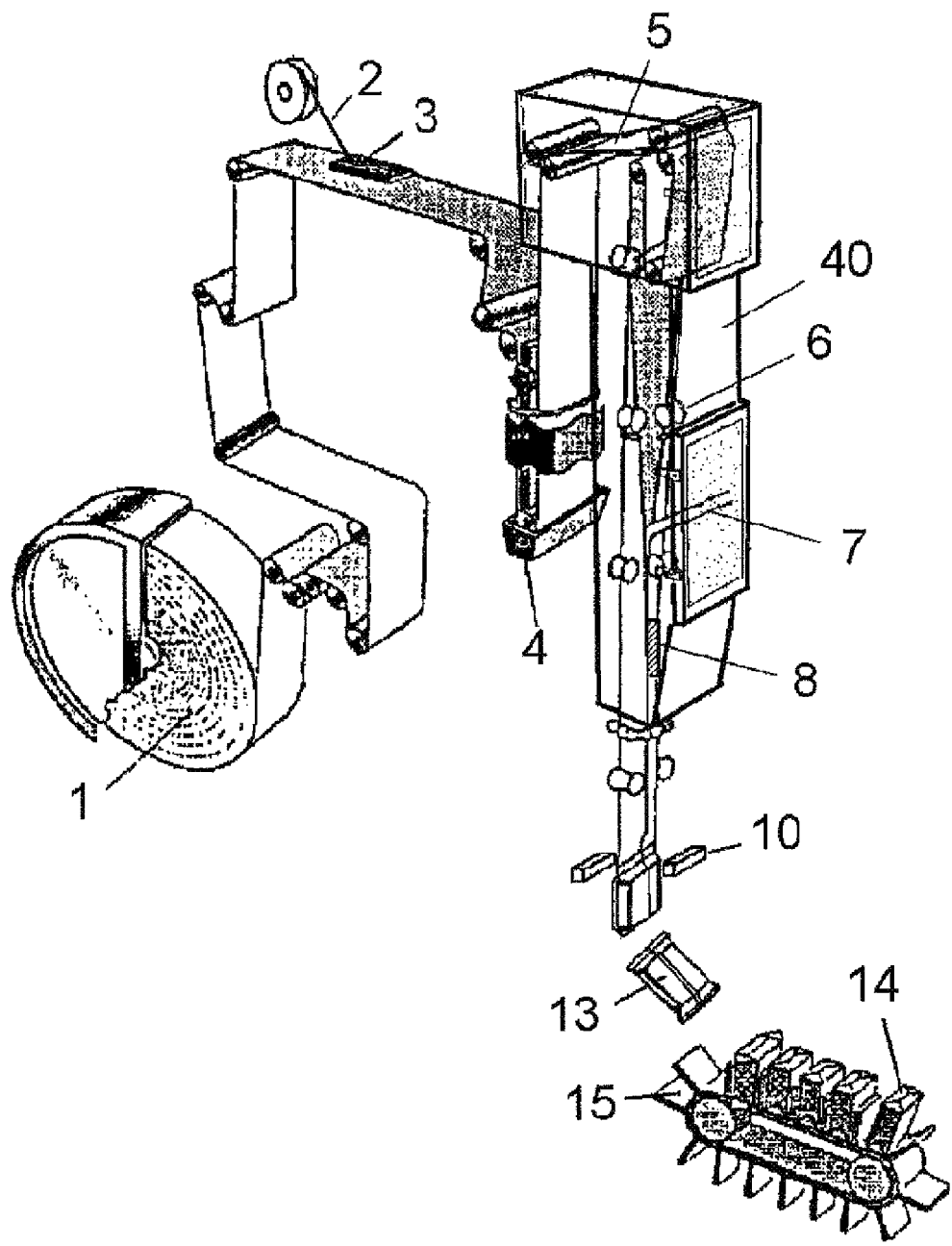
FIG. 3 is a schematic perspective view which shows an example of the packaging and filling machine usable in this invention.
Figure 4:
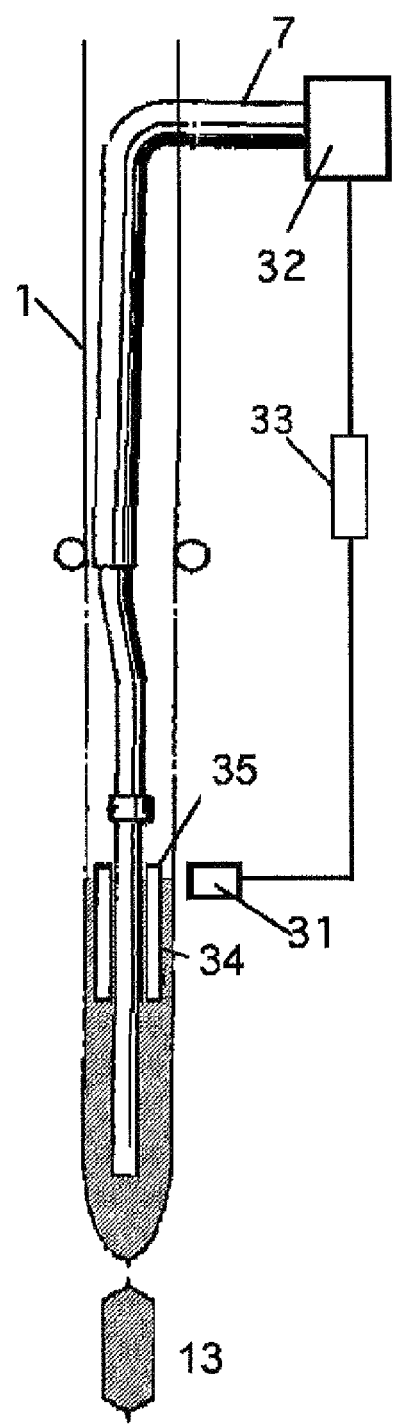
FIG. 4 shows a cross section view explaining liquid level control of the packaging and filling machine.

As shown in FIG. 3, the web-shaped laminated packaging material 1 is fed as a reel in the packaging and filling machine. The laminated packaging material 1 comprises a flexible laminate laminated with a paper substrate, a polyethylene outermost layer, a polyethylene innermost layer, an aluminum foil of the barrier layer is formed, as well as characters, designs and the like are printed.

Unwinded laminated packaging material 1 is conveyed continually by conveying means, through bending rollers, dancing rollers and the like, to a strip applicator 3, the strip 2 is attached along one edge of the laminated packaging material 1.

The laminated packaging material 1 is conveyed to a sterilization bath 4, and is sterilized by sterilization liquid of hydrogen peroxide and the like in the sterilization bath 4. The laminated packaging material 1 is carried to an air knife 5, and is carried in a sterile room 40. The laminated packaging material 1 is transformed gradually with forming rings 6, and other forming rings into tube shape. The laminated packaging material 1 is preheated with a hot air of the preheating means 8 of the longitudinal sealing apparatus to be longitudinally sealed, and liquid food is filled into the tube-shaped laminated packaging material 1 from the bottom end of the filling pipe 7.

The liquid food is filled to the predetermined liquid level from the filling pipe 7 in the tube-shaped packaging material 1, and the packaging material 1 is transversal-sealed under the liquid level in the tube-transversal direction.

In feature of this embodiment, the pressure flange is arranged in the position under the liquid level and above transversal-sealing in tube-shaped packaging material.

FIG. 1 shows the cross section front view of the pressure flange 20 of the packaging and filling machine according to the first example.

In this embodiment, the pressure flange 20 is arranged in a periphery of the lower part of the filling pipe 7a.

In this embodiment, the pressure flange 20 comprises a pipe-shaped main body 27 and a ceiling 29 of the upper part of the main body, is arranged in a periphery of the filling pipe, and the pressure buffering portion 28 having the sterilized gas space is formed in the upper end.

The pressure buffering ability of the pressure flange 20 is a function of the sterilized gas space 28.

A liquid level sensor 37 is arranged in the outer periphery of the filling pipe 7 and in the tube 1, and detects the position of the liquid level A.

The diagnosis means 50 receives signs of the liquid level A from the liquid level sensor 37, and detects the specific vibration of the liquid level A, as well as diagnoses the residual volume of the sterilized gas from the frequency of the specific vibration and the amplitude.

Figure 7:
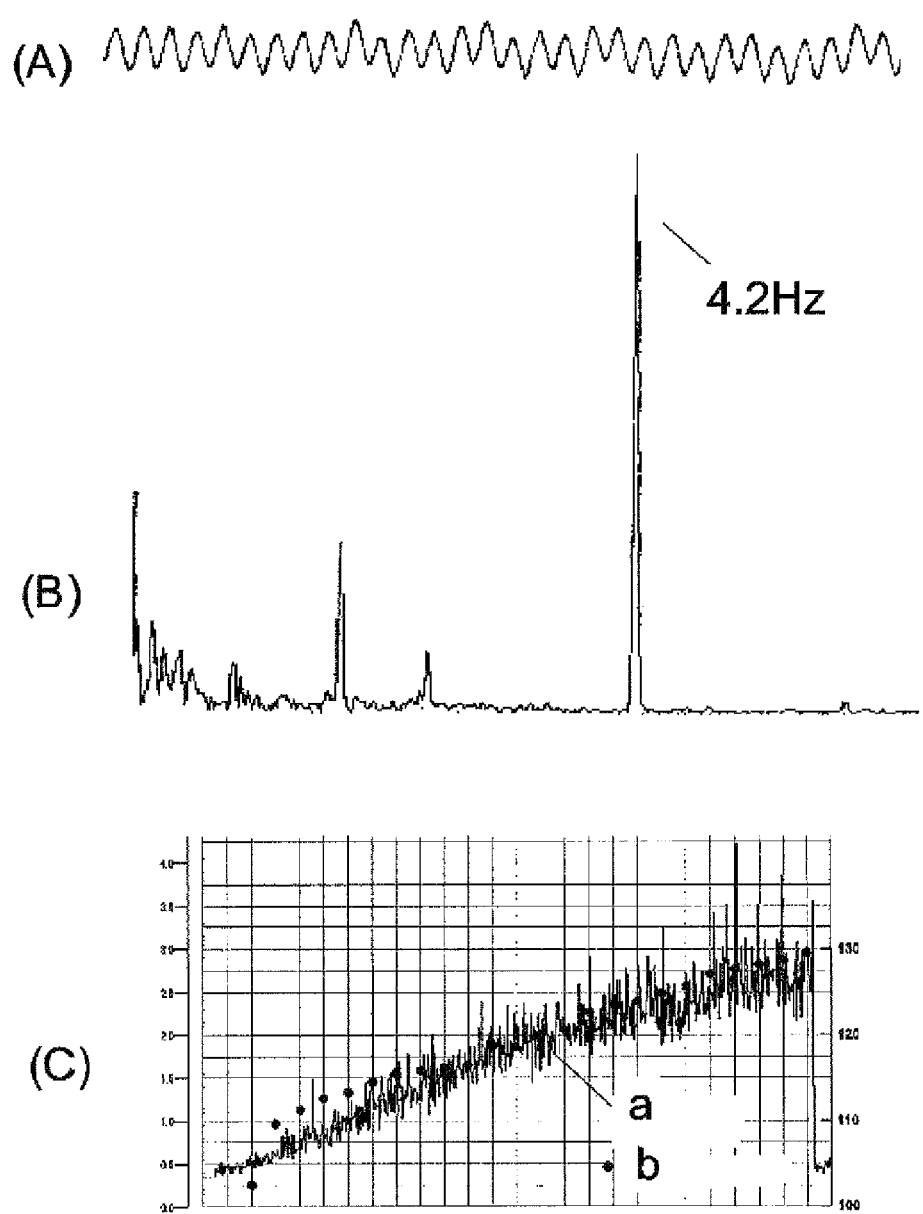
FIG. 7 shows a diagram explaining function of diagnosis by diagnosis means of the packaging and filling machine of example by this invention.

With reference to FIG. 7, the diagnosis function of the diagnosis means 50 of the packaging and filling machine of example shown in FIG. 1 is described below.

The example of the packaging and filling machine forms 15000 containers per hour with the sealing jaws and the counter jaws from the tube-shaped packaging material under the liquid level. In pinching at high speed, the packaging material is pinched 4.2 times per second, the vibration transmits in the liquid, the liquid level vibrates, and the vibration has 4.2 Hz of frequency of the specific vibration.

In this embodiment, the specific vibration on the liquid level A is detected by the liquid level sensor 37.

FIG. 7 (A) shows examples of the wave patterns of the vibration on the liquid level.

The vertical axis and the cross axle show vibration amount (amplitude) and time, respectfully.

FIG. 7 (B) shows a result of the processed extract of the frequency components contained in this sign from the wave pattern data by means of FFT (fast fourier transformation).

The peak shown in FIG. 7 (B) is the specific vibration in 4.2 Hz. The amount of the frequency component is possibly measured from the level of the peak.

In the diagnosis by the diagnosis means 50, the pressure buffering ability depends upon the volume of the sterilized gas space 28, because the size of the specific vibration at 4.2 Hz increase when the buffer capacity decreases, the residual volume of the sterilized gas is estimated from the size and is diagnosed.

FIG. 7 (C) shows that the above estimation/diagnosis are reasonable and proper.

The displacement of the position of the tube-shaped packaging material conveyed continually underneath is measured in a laser sensor fixed to the predetermined position, and changes over time are shown, as well as the size of the specific vibration in 4.2 Hz is measured too and changes over time are shown.

When the buffer capacity of the pressure buffering sterilized gas 28 decreases, the liquid pressure (pressure) rises, the tube-shaped packaging material expands or moves by means of the operations of the forming and the transversal-sealing, and the position is displaced. The displacement is considered to be inversely proportional to the residual volume of the sterilized gas.

As shown in FIG. 7 (C), the displacement of the tube (zigzag line) understandably relates to the size of the specific vibration in 4.2 Hz from the liquid level (black dots).

Figure 2:
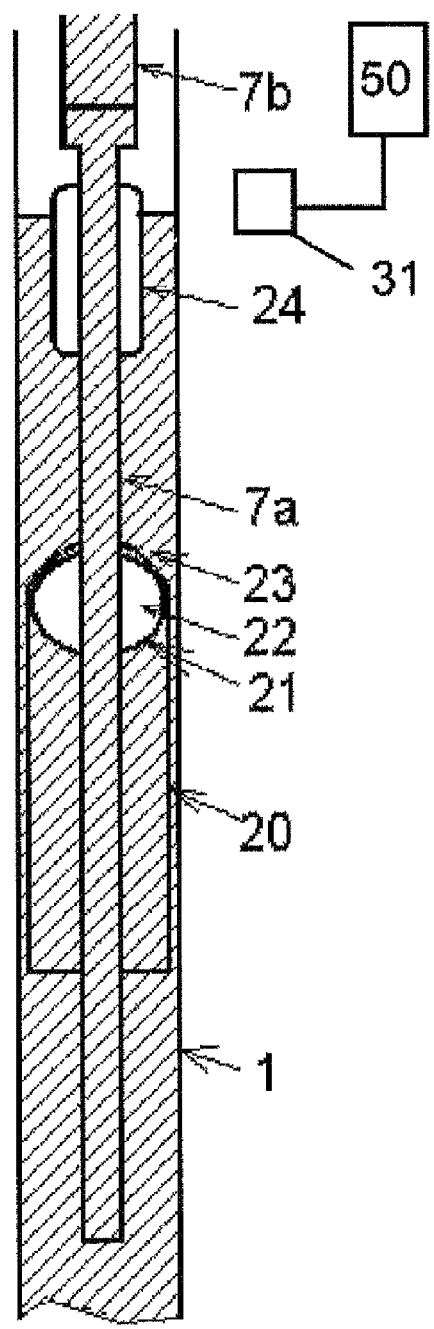
FIG. 2 shows an outline section front view of the pressure flange of the packaging and filling machine of the second example by this invention and diagnosis means.

FIG. 2 shows the cross section front view of the pressure flange 20 of the second example of the packaging and filling machine.

In this example, a cylindrical float tube 24 is arranged in the outer periphery of the filling pipe 7, in the float tube 24 floating in the liquid level A, an object to be detected (not shown, e.g. a magnet, a transmitter and a tag) is arranged, the liquid level A is detected by the detector 31 outside the tube 1.

The pressure buffering portion in the upper end comprises the elastic bag 21 arranged under the main body ceiling and the sterilized gas 22 filled in the elastic bag.

Because the buffering part 22 is the sterilized gas, the gas easily compresses and expands, and the buffering action is shown.

By means of the balloon-shaped elastic bag, the volume of the sterilized gas is constantly kept, gas lost by the vibration and the flow of the liquid decreases. In addition, there is danger to accumulate gas in the ceiling of the pressure flange 20 by trap of air bubble/dissolved gas in the filled liquid, but in this example, it is possible to let out from a little hole 23 provided in the ceiling.

In this embodiment, the pressure flange 20 is arranged in outer periphery of the lower part of the filling pipe 7a. The pressure flange 20 does not interfere with arranging of the filling pipe 7a, and the space in the tube-shaped packaging material can be utilized effectively. In addition, when the lower part filling pipe 7a is washed, it is possible to detach, clean and install them at one.

Figure 6:
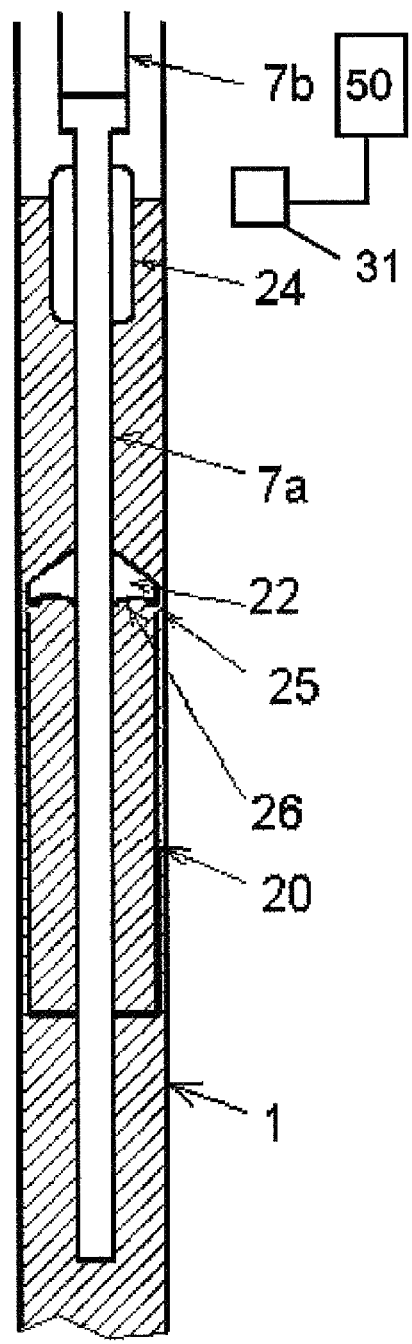
FIG. 6 shows an outline section front view of pressure flange of the packaging and filling machine of the third example by this invention and diagnosis means.

FIG. 6 shows the cross section front view of the pressure flange 20 of the third example of the packaging and filling machine.

In this example, the pressure buffering portion of the upper end comprises the elastic membrane 26 arranged below the main body ceiling and the sterilized gas 22 filled in the space between the ceiling and the elastic membranes.

Because the buffering portion 22 is the sterilized gas, the gas easily compress, expands and buffers. By means of the elastic membrane 26, the volume of the sterilized gas is constantly kept, gas lost by the vibration and the flow of the liquid decreases. In addition, there is danger to accumulate gas in the ceiling of the pressure flange 20 by trap of air bubble/dissolved gas in the filled liquid, but in this example, it is possible to let out from a little hole 25 provided in the ceiling.

The liquid food is filled to the predetermined liquid level from the filling pipe into the tube-shaped packaging material, and is adjusted.

Figure 5:
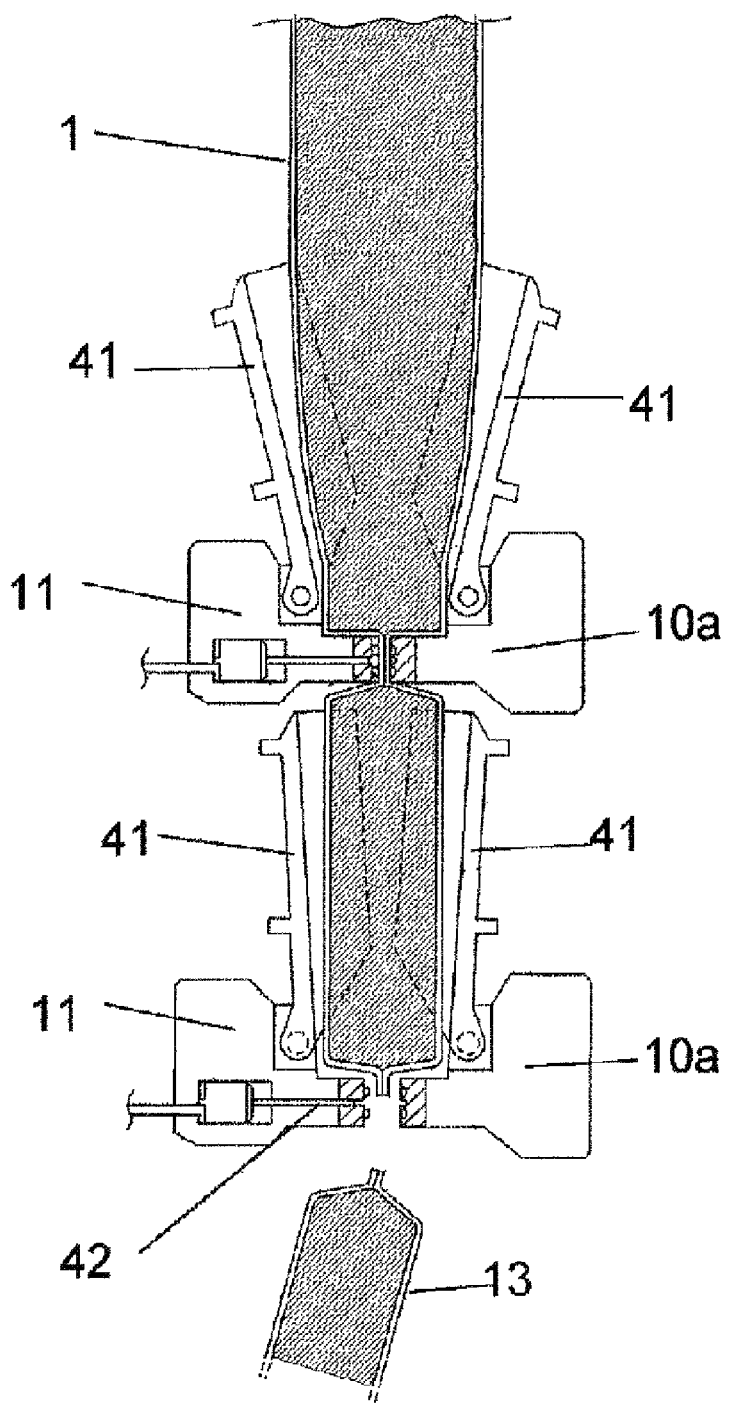
FIG. 5 shows a cross section view explaining a transversal sealing apparatus of the packaging and filling machine.

The tube-shaped laminated packaging material 1, as shown in FIG. 5, while the tube-shaped packaging material 1 is carried to each length corresponding to one container downward, is sandwiched by two pairs of the forming flaps 41, 41, is formed as an approximate container shape, is pinched by two pairs of the seal jaws 10a, 10a and the counter jaws 11, 11, and is transversal-sealed in transverse direction, as well as two transversal-sealing zones are formed, and the middle of the seal zone of the connected pillow-shaped preforming bodies is cut by knife 42 and is separated in individual pillow-shaped preforming body 13.

The preforming container 13 is conveyed by a final forming conveyer 15, and is formed as the final shape, and the package container 14 with the liquid food is completed.

Figure 10:
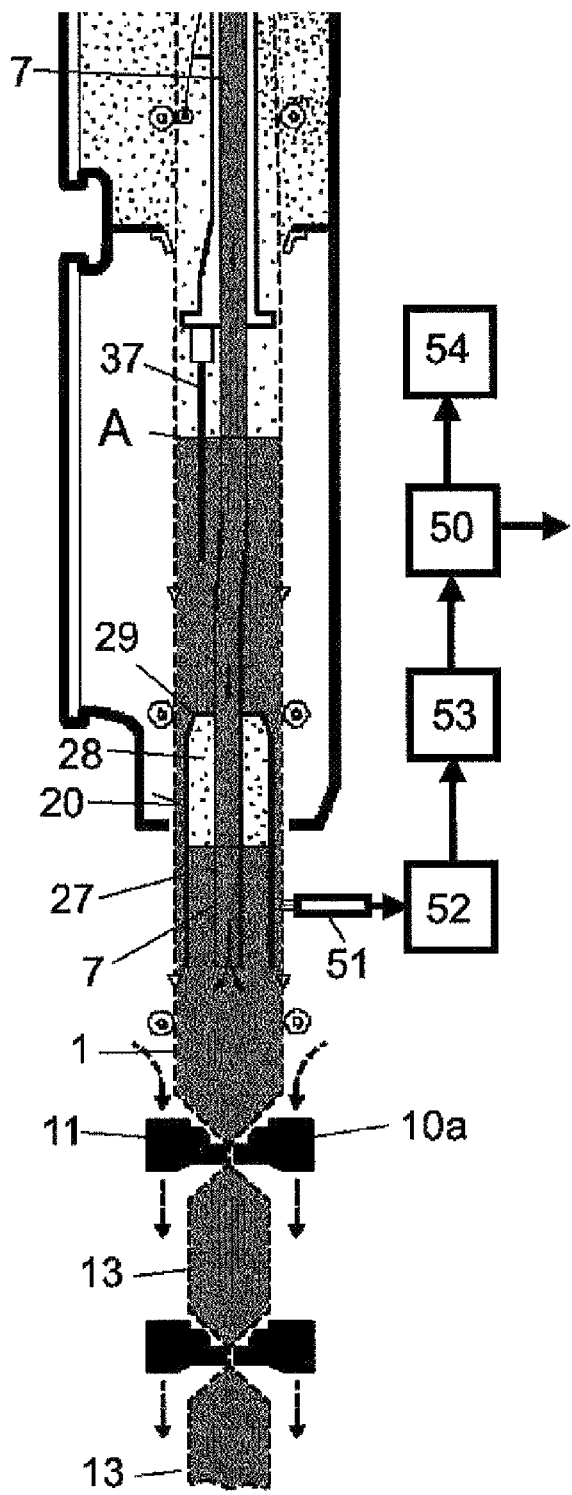
FIG. 10 is a section front view which shows the structure of the diagnosis means of the packaging and filling machine of the fourth example by this invention.

FIG. 10 shows the cross section front view of the pressure flange 20 and its neighborhood of the fourth example of the packaging and filling machine.

In this example, the pressure flange 20 comprises the pipe-shaped main body 27 and the ceiling of upper part 29 of the main body, and is arranged in the periphery of the filling pipe 7, and the pressure buffering portion 28 of the sterilized gas space 22 is formed in the upper end.

The pressure buffering portion 28 of the pressure flange 20 absorbs and buffers the liquid and the pressure pushed from below.

The liquid and the pressure pushed from below do not reach above the pressure flange 20, and the liquid level is easily controlled by the liquid level sensor 37 without the fluctuation or the swinging of the liquid level A.

In addition, because there is the buffering field in the position under the liquid level and nearer to the transversal-sealing position, the resistance (reaction) of the operation of the forming and the transversal-sealing can be reduced, even the forming flaps 41, the seal jaws 10a and the counter jaws 11 hit powerfully at high speed, the surfaces of the packaging material 1 are not scratched, and the longitudinal sealings of the pillow-shaped preforming body 13 are not damaged.

In this example, an effective arrangement can be taken in the periphery of the filling pipe 7. It can have a simple configuration with the pipe 27 and the ceiling 29. The sterilized gas can be easily re-filled up because the pressure buffering portion 28 comprising of sterilized gas 22 is formed in the upper end.

Figure 11:
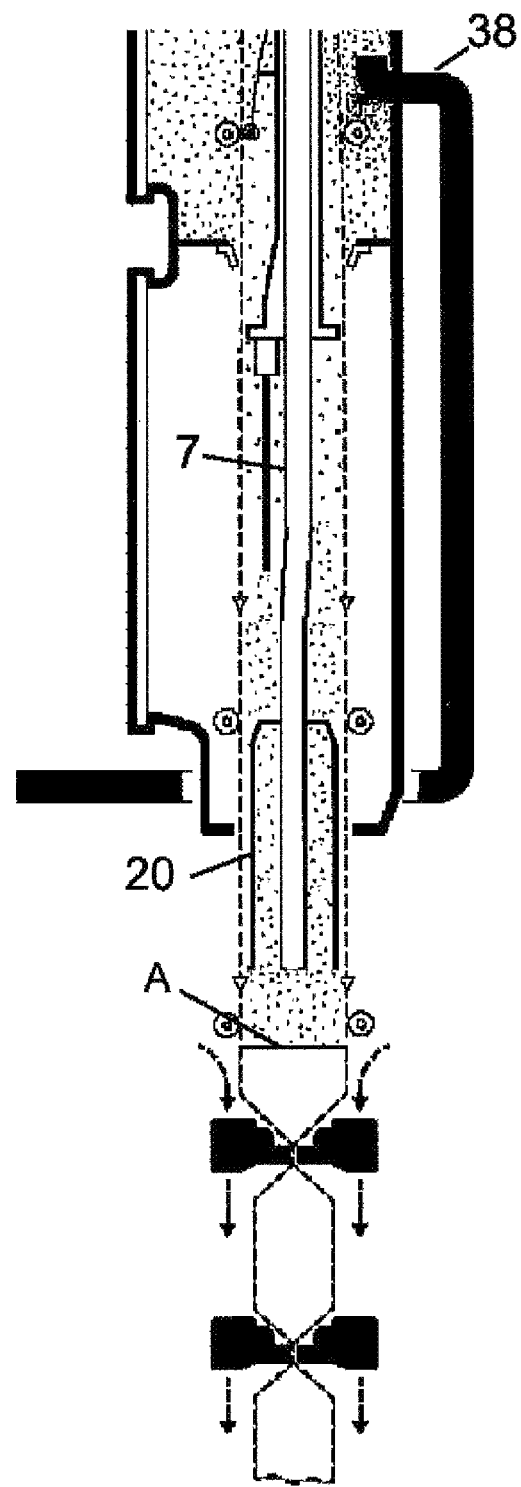
FIG. 11 is a cross section view which shows re-filling of the sterilized gas of the packaging and filling machine of the fourth example by this invention.

In FIG. 11, in the fourth example of the packaging and filling machine, the mode in which the sterilized gas is re-filled to the pressure flange 20 is illustrated.

In the example of the packaging and filling machine, in the operation, the liquid food is fed from the filling pipe 7 continually and in large amounts, and is filled to the containers in high speed, the sterilized gas in the pressure flange 20 gradually decreases by loss as a bubble and absorbing of the liquid food.

In the re-filling, the feeding of the liquid food from the filling pipe 7 is stopped, the liquid level A is lowered to the pressure flange 20, by means of supplying the sterilized gas from a sterilized gas feeding pipe 38 as shown in FIG. 11, the sterilized gas can be easily re-filled in the pressure flange 20.

In this embodiment, the vibration of the tube 1 by pinching with the seal jaws 10a and the counter jaws 11 is detected, and the diagnosis means 50 diagnosing the residual volume of the sterilized gas from the vibration is comprised.

In this embodiment, the vibration of the tube by pinching with the seal jaws and the counter jaws is detected with a laser displacement meter 51.

When the tube moves from one position to another position by means of the vibration, the displacement meter measures the movement distance. An analog data is received by a data receiver 52 from the displacement meter 51, and is transmitted to a diagnosis means 50 through an analog-to-digital conversion device 53. The detected vibration amount or the variate over time of the vibration amount and the predetermined vibration amount or the variate are compared with, and the timing of the re-filling is diagnosed.

For the case of diagnosis to the timing of re-filling, a control signal is transmitted to a control means 54 of the packaging and filling machine and/or to a display device or an alarm warning to operators about the timing of re-filling.

Figure 8:
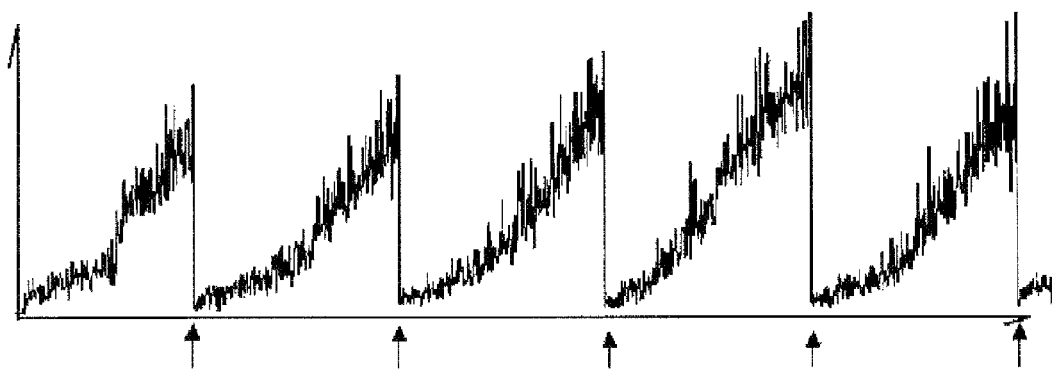
FIG. 8 shows a correlation diagram of vibration amounts and the residual volume of the sterilized gas of the tube.

In the diagram of FIG. 8 showing the correlation with the vibration amount and the residual volume of the sterilized gas of the tube, the vertical axis shows the vibration amount of the tube, and the cross axle shows the operation hours. The sterilized gas decreases along with course of the operating time of the filling machine (and the pressure buffer capacity deteriorates), and, as shown in the figure, the vibration amounts of the tube increase. In addition, when the sterilized gas is re-filled at the time shown as an arrow, the vibration amount of the tube return in the minimum, and the pressure buffer capacity is recovered.

In the diagnosis means 50 of this embodiment, the decrease of the sterilized gas amount (deteriorating of the pressure buffer capacity) is detected precisely, and the sterilized gas is re-filled, and the pressure buffer capacity is recovered accuracy and effectively.

As criteria of the diagnosis, there are a method diagnosing as the timing of re-filling when a predetermined threshold of the vibration amount is exceeded and a method diagnosing estimating time as the timing of re-filling that the timing of re-filling is estimated from the variate over time of the vibration amount.

In preferred embodiment of this invention, in correspondence with kinds of the is filled liquid food, kinds and specifications of the packaging material, the vibration amount of the tube (variate over time of the vibration amount) at the timing to be re-filled is predetermined, when the predetermined vibration amount (the variate over time of the vibration amount) is detected, the sterilized gas can be re-filled.

Figure 9:
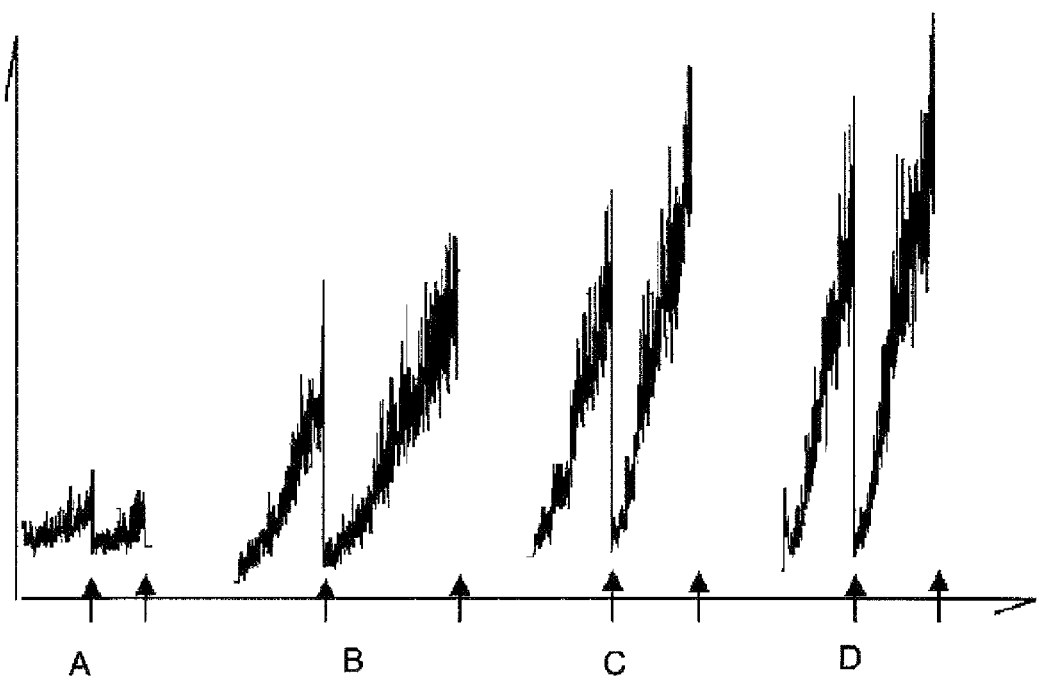
FIG. 9 shows a correlation diagram of the residual volume of the sterilized gas and the vibration amount of the tube about four kinds of filled different liquid foods.

FIG. 9 is the diagram showing correlation with the vibration amounts of the tube and the residual volume of the sterilized gas when four kinds of different liquid foods (fruit juice in FIG. 9A), vegetables juice in FIG. 9B, coffee in FIG. 9C and Caffe Latte in FIG. 9D) are filled. The vertical axis shows the vibration amount of the tube, and the cross axle shows the operation hours. After start-up of the filling machine, vibration amounts of the tube increase along with course of time, the vibration amount of the tube returns to the minimum by means of re-filling of the sterilized gas at the time shown as an arrow understandably. In addition, in accordance with a kind of the liquid food, the thresholds of timing of re-filling (the vibration amount of the tube) are different understandably.

The foregoing description has been presented for purposes of illustration and description. It is not intended to be exhaustive or to limit the inventions to the precise embodiments disclosed. Obvious modifications or variations are possible in light of the above teachings.

[Industrial Applicability]

In accordance with the packaging and filling machine of this invention, package containers for such as milk, juice, mineral water, and fluid diet product can be manufactured.

The invention claimed is:

1. A packaging and filling machine, in which a web-like packaging laminated material is formed to a tube shape, the tube-like packaging material is longitudinally sealed along the longitudinal direction in both ends of the packaging material, liquid food is filled up to a liquid level of a predetermined position into the tube-like packaging material, while the tube-like packaging material is held with seal jaws and counter jaws below the liquid level at high speed, the tube-like packaging material is transversally sealed by heating and pressing with the seal jaws and the counter jaws along transversal direction, the tube-like packaging material is cut in the transversal seal zone, and packaged containers are manufactured, characterized in that the packaging and filling machine has a pressure-buffering pressure flange provided under the liquid level in the tube-like packaging material and above the transversal-sealing position, as well as comprising a sterilized gas space buffering movement of the liquid food, and a diagnostic means detecting vibration generating by clamping with the seal jaws and counter jaws to diagnose the residual volume of the sterilized gas from the detected vibration.

2. A packaging and filling machine according to claim 1, wherein the vibration is the specific vibration of the liquid level, and the diagnosis means diagnoses a residual volume of the sterilized gas from frequency and amplitude of the vibration.

3. A packaging and filling machine according to claim 2, wherein the pressure flange comprises a pipe-shaped main body and a ceiling at the upper part of the main body, and is arranged in a periphery of the filling pipe, a pressure buffering portion of the sterilized gas space is formed at the upper part.

4. A packaging and filling machine according to claim 2, wherein the pressure buffering portion comprises an elastic membrane arranged under the ceiling of the main body, and the sterilized gas filled in the space formed between the elastic membrane and the ceiling.

5. A packaging and filling machine according to claim 2, wherein the pressure buffering portion comprises an elastic bag arranged under the ceiling of the main body, and the sterilized gas filled in the elastic bag.

6. A packaging and filling machine according to claim 1, wherein the vibration is a specific vibration of the tube.

7. A packaging and filling machine according to claim 6, where the pressure flange comprises a pipe-shaped main body and a ceiling at the upper part of the main body, and is arranged in a periphery of the filling pipe, a pressure buffering portion of the sterilized gas space is formed at the upper part.

8. A packaging and filling machine according to claim 6, where a displacement meter detects the vibration.

* * * * *